United States Patent
Nakamura et al.

(10) Patent No.: US 7,482,934 B2
(45) Date of Patent: Jan. 27, 2009

(54) COMMUNICATION DEVICE AND COMMUNICATION METHOD

(75) Inventors: Norihiro Nakamura, Kawasaki (JP); Hirotaka Nishida, Machida (JP); Naohiro Hirota, Kawasaki (JP); Haruo Obana, Kawasaki (JP); Ichirou Ono, Kawasaki (JP); Takeshi Miki, Kawasaki (JP); Takao Nakamura, Kawasaki (JP); Hideshi Numata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 11/778,848

(22) Filed: Jul. 17, 2007

(65) Prior Publication Data
US 2008/0018428 A1    Jan. 24, 2008

Related U.S. Application Data

(63) Continuation of application No. PCT/JP2005/000476, filed on Jan. 17, 2005.

(51) Int. Cl.
*G08B 13/14* (2006.01)

(52) U.S. Cl. .............. 340/572.8; 340/572.4; 340/572.5; 340/572.7; 340/572.3; 340/572.1; 340/10.1; 343/741; 343/742; 343/866; 343/867; 343/895

(58) Field of Classification Search .............. 340/572.1, 340/572.3, 572.4, 572.5, 572.7, 572.8, 10.1; 343/741–742, 866–867, 895
See application file for complete search history.

(56) References Cited

U.S. PATENT DOCUMENTS

| | | | | |
|---|---|---|---|---|
| 4,495,503 A * | 1/1985 | Morman | ...................... | 343/746 |
| 5,489,914 A * | 2/1996 | Breed | .......................... | 343/818 |
| 6,028,564 A * | 2/2000 | Duan et al. | .................. | 343/818 |
| 6,046,703 A * | 4/2000 | Wang et al. | .................. | 343/795 |
| 6,154,137 A * | 11/2000 | Goff et al. | ................ | 340/572.4 |
| 7,084,769 B2 * | 8/2006 | Bauer et al. | .............. | 340/572.7 |
| 7,310,070 B1 * | 12/2007 | Hardman et al. | ............ | 343/742 |
| 7,323,977 B2 * | 1/2008 | Kodukula et al. | ........... | 340/505 |
| 7,417,599 B2 * | 8/2008 | Goff et al. | .................... | 343/867 |
| 7,421,245 B2 * | 9/2008 | Lieffort et al. | ............. | 455/41.1 |

(Continued)

FOREIGN PATENT DOCUMENTS

JP    2000113077 A    4/2000

(Continued)

OTHER PUBLICATIONS

International Search Report of PCT/JP2005/000476, date of mailing Mar. 29, 2005.

*Primary Examiner*—George A Bugg
*Assistant Examiner*—Son M Tang
(74) *Attorney, Agent, or Firm*—Westerman, Hattori, Daniels & Adrian, LLP.

(57) ABSTRACT

A communication device includes a radio frequency identification tag that performs a radio communication with a predetermined device. A first metal body has an electrical conductivity. A space adjustment unit is configured to adjust a space between the first metal body and the radio frequency identification tag. The first metal body is configured to be replaced with a second metal body, and when the first metal body is replaced with the second metal body, the space adjustment unit is configured to adjust a space between the second metal body and the radio frequency identification tag.

4 Claims, 4 Drawing Sheets

U.S. PATENT DOCUMENTS

| | | |
|---|---|---|
| 2003/0169149 A1 | 9/2003 | Ohki et al. |
| 2004/0178911 A1 | 9/2004 | Sakamoto et al. |
| 2005/0030251 A1* | 2/2005 | Okamura et al. ............ 343/895 |
| 2005/0270159 A1* | 12/2005 | Brady et al. ............. 340/572.1 |
| 2006/0220869 A1* | 10/2006 | Kodukula et al. ........ 340/572.7 |
| 2007/0171081 A1* | 7/2007 | Dixon et al. ............. 340/572.8 |
| 2007/0241969 A1* | 10/2007 | Andrenko et al. ..... 343/700 MS |

FOREIGN PATENT DOCUMENTS

| | | |
|---|---|---|
| JP | 2001116583 A | 4/2001 |
| JP | 200222825 A | 1/2002 |
| JP | 200398253 A | 4/2003 |
| JP | 2003198422 A | 7/2003 |
| JP | 20032632622 A | 9/2003 |
| JP | 2003298465 A | 10/2003 |
| JP | 2003536296 A | 12/2003 |
| JP | 2004210428 A | 7/2004 |
| JP | 2004258914 A | 9/2004 |
| WO | 0019235 A1 | 4/2000 |
| WO | 0194967 A2 | 12/2001 |
| WO | 03071701 A1 | 8/2003 |

* cited by examiner

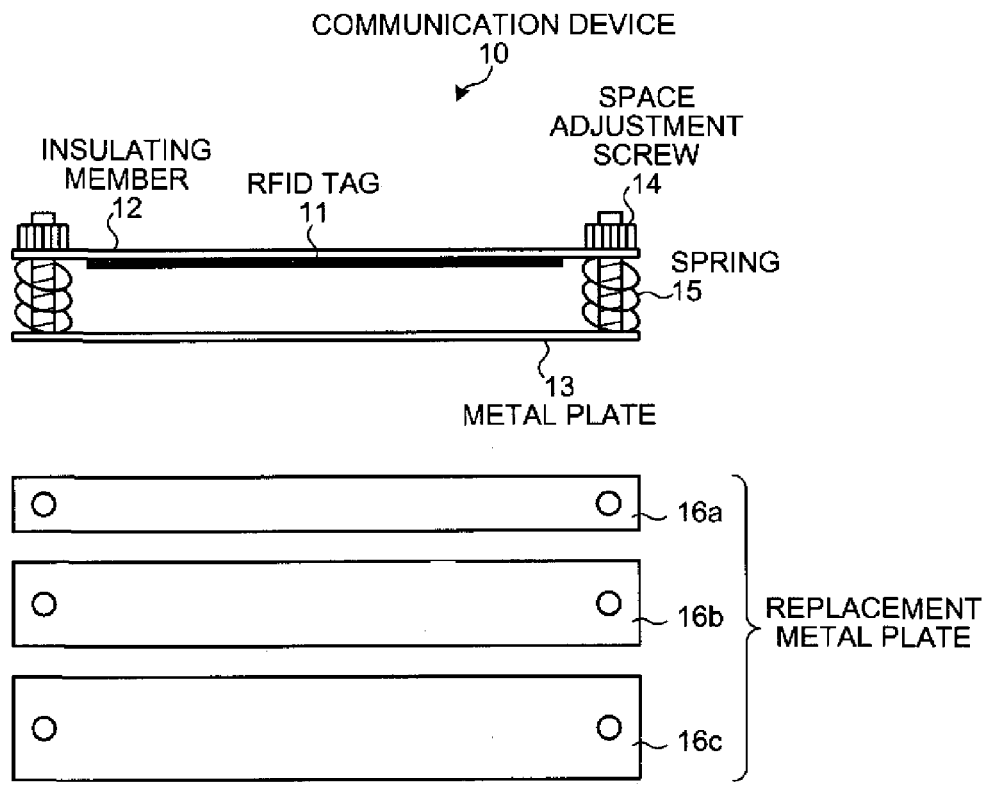
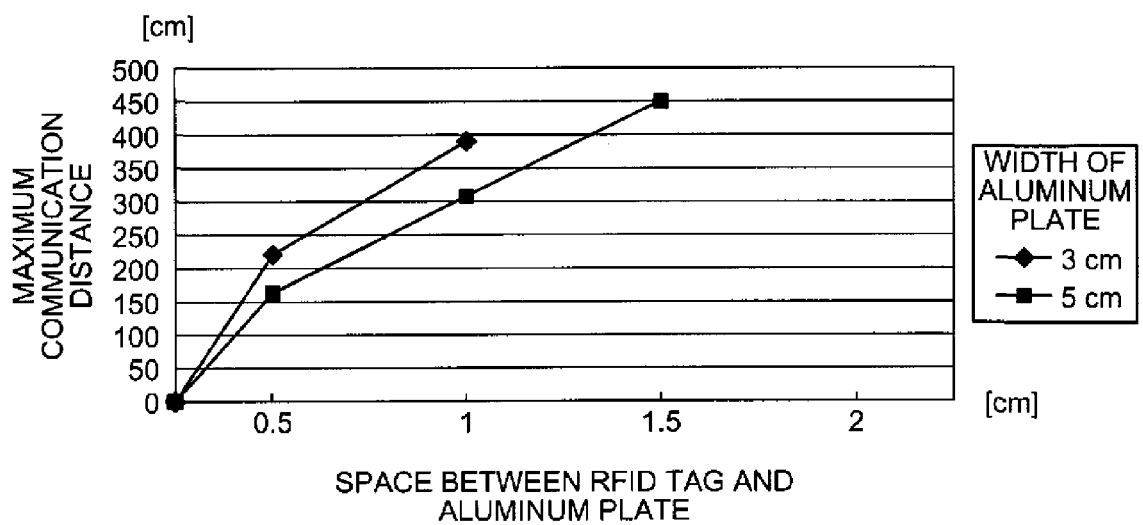

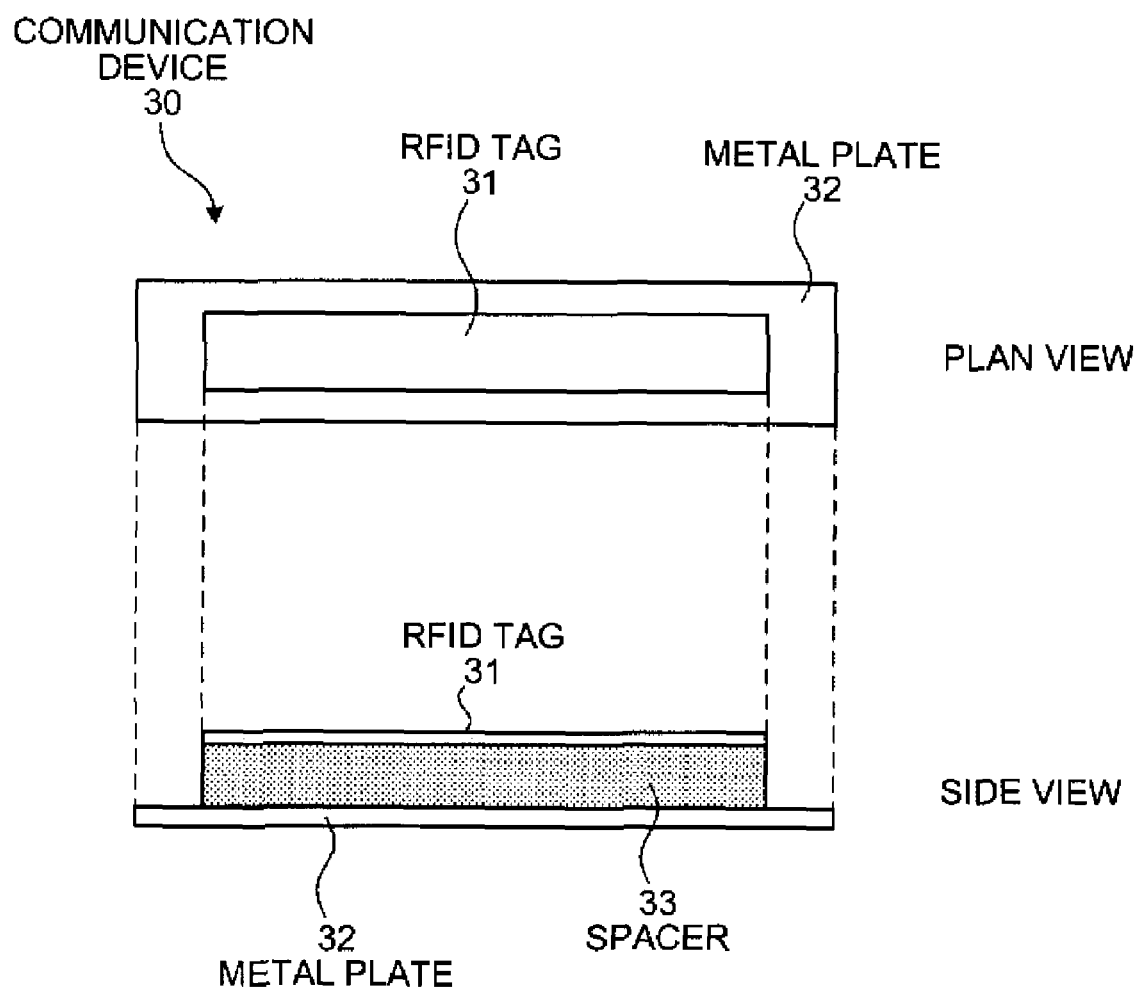

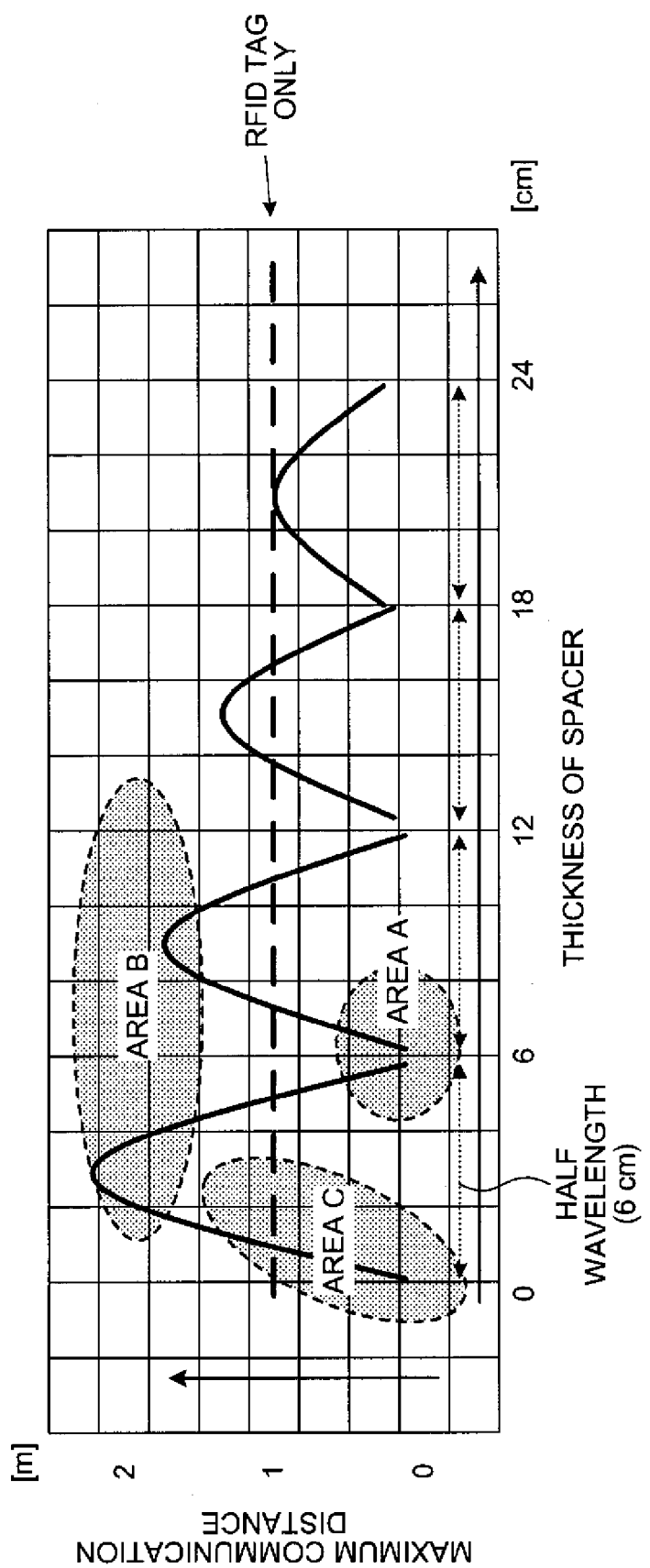

COMMUNICATION DEVICE AND COMMUNICATION METHOD

BACKGROUND OF THE INVENTION

1. Field of the Invention

The present invention relates to a technology for controlling a distance and a directivity of a radio communication.

2. Description of the Related Art

A radio frequency identification (RFID) tag is currently commercialized and increasingly in use in a field of physical distribution. For example, a system for managing goods or products stored in a warehouse or the like by using the RFID tag is disclosed in Japanese Patent Application Laid-Open No. 2000-113077.

The RFID tag is also called an integrated circuit (IC) tag, which stores therein various data and performs a radio communication with a reader/writer that performs a data read/write with respect to the RFID tag.

A communication range between the RFID tag and the reader/writer and a directivity of a communication radiowave vary depending on a variation in conditions, such as output level of the radiowave of the REID tag, antenna size, antenna wiring, and antenna type.

In other words, if it is required to perform a communication with a reader/writer located in a remote place, or to adjust the directivity of the communication radiowave, the RFID tag needs to be replaced with other type of RFID tag suitable for each condition to achieve a desired result.

However, with a conventional technology described above, when it is required to control the distance or the directivity of the radio communication in a place where the RFID tag is installed, it is difficult to respond to such requests in an expedited manner.

Specifically, because substances such as metal and moisture existing in the place where the RFID tag is installed cause a disturbance of the radio communication, it is necessary to adjust the distance and the directivity of the radio communication depending on an environment of the place for realizing a stable radio communication.

In this case, for adjusting the distance and the directivity of the radio communication, it is necessary to replace the RFID tag with other type of RFID tag suitable for a desired condition, which necessitates preparation of various types of RFID tags in advance.

Thus, there is a demand to easily and effectively control the distance and the directivity of the radio communication without performing cumbersome operations, such as an operation of replacing the RFID tag.

SUMMARY OF THE INVENTION

It is an object of the present invention to at least partially solve the problems in the conventional technology.

A communication device according to one aspect of the present invention includes a radio frequency identification tag that performs a radio communication with a predetermined device, a first metal body having an electrical conductivity, and a space adjustment unit configured to adjust a space between the first metal body and the radio frequency identification tag. The first metal body is configured to be replaced with a second metal body, and when the first metal body is replaced with the second metal body, the space adjustment unit is configured to adjust a space between the second metal body and the radio frequency identification tag.

A communication device according to another aspect of the present invention includes a radio frequency identification tag that performs a radio communication with a predetermined device, a metal body having an electrical conductivity, and a space adjustment unit configured to adjust a space between the metal body and the radio frequency identification tag. The space adjustment unit is a screw, and the space between the radio frequency identification tag and the metal body is adjusted by tightening and loosening the screw.

A method of performing a radio communication between a radio frequency identification tag and a predetermined device, according to still another aspect of the present invention, includes adjusting a space between the radio frequency identification tag and a metal body having an electrical conductivity; and performing a radio communication between the radio frequency identification tag and the predetermined device after adjusting the space between the radio frequency identification tag and the metal body.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram for explaining a communication device according to a first embodiment of the present invention;

FIG. 2 is a graph for explaining a relation between a maximum communication distance between an RFID tag and a reader/writer and a space between the RFID tag and a metal plate shown in FIG. 1;

FIG. 4 is a schematic diagram of a communication device according to a second embodiment of the present invention; and FIG. 5 is a schematic diagram for explaining a relation between a thickness of a spacer and a maximum communication distance between an RFID tag and a reader/writer, according to the second embodiment.

DETAILED DESCRIPTION OF THE PREFERRED EMBODIMENTS

Figure 3:
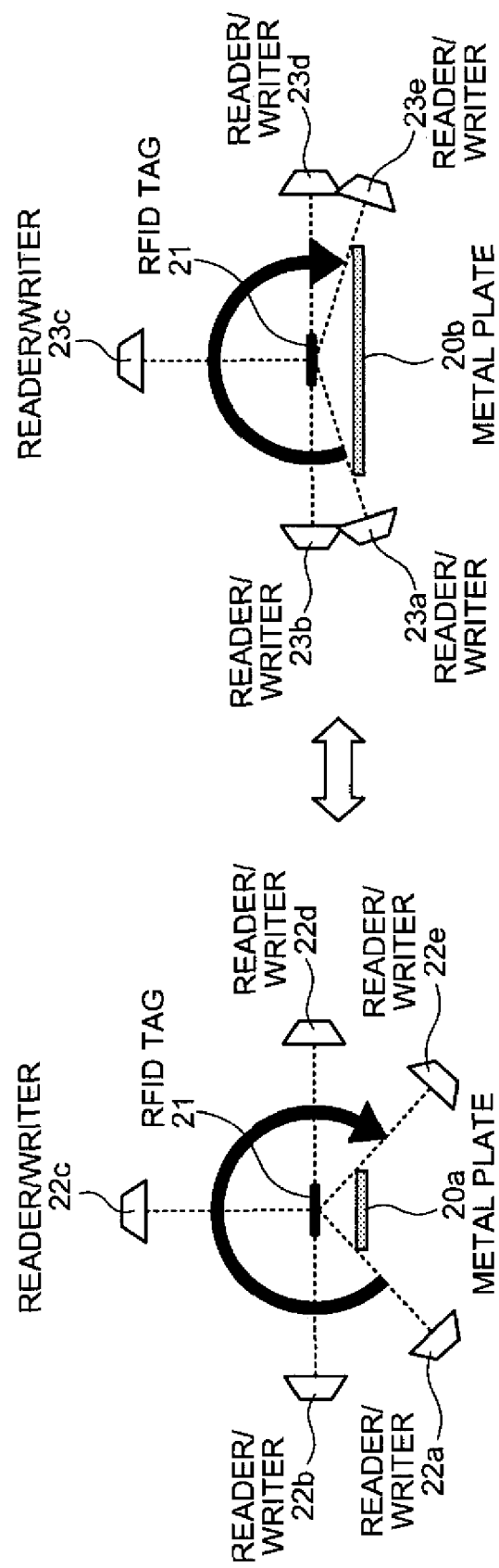
FIG. 3 is a schematic diagram for explaining each of situations, where a width of a metal plate affects a directivity of a radio communication between an REID tag and reader/writers, according to the first embodiment.

Exemplary embodiments of the present invention are explained in detail below with reference to the accompanying drawings. The present invention is not limited to the embodiments.

FIG. 1 is a schematic diagram for explaining a communication device 10 according to a first embodiment of the present invention. The communication device 10 includes an RFID tag 11, an insulating member 12, a metal plate 13, a space adjustment screw 14, and a spring 15.

The RFID tag 11 stores various data in a built-in memory and performs a radio communication with a reader/writer that reads and writes data with respect to the RFID tag 11.

The insulating member 12 is made of plastic or the like and holds the RFID tag 11. The metal plate 13 has an electrical conductivity and is made of aluminum, copper, iron, stainless steel, or the like.

The space adjustment screw 14 is capable of adjusting a space between the RFID tag 11 and the metal plate 13 by being tightened or loosened. The spring 15 extends the space between the insulating member 12 and the metal plate 13 to balance a rotation of the space adjustment screw 14.

The metal plate 13 can be easily detached by loosening the space adjustment screw 14, so that it is possible to replace the metal plate 13 with different type of metal plate formed in a different shape or made of different material, such as replacement metal plates 16a to 16c each having a unique width different from a width of the metal plate 13 shown in FIG. 1.

FIG. 2 is a graph for explaining a relation between the space between the RFID tag 11 and the metal plate 13 (for example, an aluminum plate) and a maximum communication distance between the RFID tag 11 and a reader/writer. The graph is based on the assumption that the metal plate 13 is made of aluminum and a frequency band of a communication radiowave is an ultra-high frequency (UHF) band.

In this case, the vertical axis represents the maximum communication distance of the RFID tag 11, and the horizontal axis represents the space between the RFID tag 11 and the metal plate 13. There are two cases described in the graph; one case is such that the metal plate 13 with 3-centimeter (cm) width is employed while another case is such that the metal plate 13 with 5-cm width is employed.

As shown in FIG. 2, the maximum communication distance becomes longer as the space between the RFID tag 11 and the metal plate 13 becomes wider, with each of the metal plates 13 in different widths. When compared with a same space between the RFID tag 11 and the metal plate 13, the maximum communication distance becomes longer with the metal plate 13 having 3-cm width than with the metal plate 13 having 5-cm width.

When the space between the RFID tag 11 and the metal plate 13 is zero, that is, when the RFID tag 11 comes contact with the metal plate 13, the maximum communication distance becomes zero, so that the communication function of the RFID tag 11 is disabled.

Furthermore, when the metal plate 13 is not used, the maximum communication distance of the RFID tag 11 becomes 250 cm. As described above, the maximum communication distance can be extended and shortened by adjusting the space between the RFID tag 11 and the metal plate 13.

FIG. 3 is a schematic diagram for explaining situations, where a width of each of metal plates 20a and 20b affects a directivity of the radio communication between an RFID tag 21 and each of reader/writers 22a to 22e, and 23a to 23e.

In the example shown in FIG. 3, the metal plates 20a and 20b having different widths are set with a predetermined space from the RFID tag 21, using the space adjustment screw 14. In this case, the reader/writers 22a to 22e and 23a to 23e include a built-in antenna and perform radio communication with the RFID tag 21.

As shown in the left side of FIG. 3, when the metal plate 20a with a narrow width is set, an area where the communication radiowave is blocked by the metal plate 20a becomes narrow, so that a communicable angle indicated by an arrow between the reader/writers 22a and 22e becomes wide, in which a communication is enabled between the RFID tag 21 and each of the reader/writers 22a to 22e.

On the other hand, when the metal plate 20b with a wide width is set, as shown in the right side of FIG. 3, an area where the communication radiowave is blocked by the metal plate 20b becomes wide, so that a communicable angle indicated by an arrow between the reader/writers 23a and 23e becomes narrow, in which a communication is enabled between the RFID tag 21 and each of the reader/writers 23a to 23e.

In this manner, the directivity of the radio communication between the RFID tag 21 and each of the reader/writers 22a to 22e and 23a to 23e can be adjusted by setting the metal plates 20a and 20b each having a different width, with a predetermined space kept from the RFID tag 21.

As described above, according to the first embodiment, the space between the RFID tag 11 and the metal plate 13 can be adjusted, so that it is possible to easily and effectively control the distance and the directivity of the radio communication.

Furthermore, the metal plate 13 can be replaced with other type of metal body. For example, when the metal plate 13 is replaced with the replacement metal plates 16a to 16c, because the space between the REID tag 11 and the other type of metal body can be adjusted, it is possible to easily and effectively control the distance and the directivity of the radio communication by replacing the attached metal plate 13 with any one of the replacement metal plates 16a to 16c each having a different shape.

Moreover, the space between the RFID tag 11 and the metal plate 13 can be adjusted by tightening and loosening the space adjustment screw 14. As a result, it is possible to easily and effectively control the distance and the directivity of the radio communication in a desired place.

Furthermore, the communication function of the RFID tag 11 can be disabled by bringing the RFID tag 11 into contact with the metal plate 13, so that it is possible to easily disable the function of the RFID tag 11 in a desired place if required.

Moreover, a radio communication with the reader/writer is performed after the space between the RFID tag 11 and the metal plate 13 is adjusted by the space adjustment screw 14. Therefore, it is possible to easily and effectively control the distance and the directivity of the radio rave communication to be performed.

Although the space between the RFID tag 11 and the metal plate 13 is adjusted by tightening and loosening the space adjustment screw 14 according to the first embodiment, it is possible to configure in such a manner that the space between the RFID tag and the metal plate is adjusted by attaching the RFID tag to the metal plate via a spacer having a predetermined thickness.

An example in which the RFID tag is attached to the metal plate via a spacer having a predetermined thickness is described in a second embodiment of the present invention.

FIG. 4 is a schematic diagram of a communication device 30 according to the second embodiment. A plan view and a side view of the communication device 30 are shown in FIG. 4.

The communication device 30 includes an RFID tag 31, a metal plate 32, and a spacer 33.

The RFID tag 31 stores various data in a built-in memory and performs a radio communication with a reader/writer that reads and writes data to/from the RFID tag 31.

The metal plate 32 has electrical conductivity and is made of aluminum, copper, iron, stainless steel, or the like.

The spacer 33 is a nonconductive and nonmetallic body made of balsa wood, foam polystyrene, or the like, and maintains a predetermined space between the RFID tag 31 and the metal plate 32. By replacing the spacer 33 with other type of spacer having a different thickness, it is possible to control a communication distance of a radio communication performed by the RFID tag 31.

FIG. 5 is a schematic diagram for explaining a relation between a thickness of the spacer 33 and a maximum communication distance between the RFID tag 31 and a reader/writer. In the example shown in FIG. 5, the vertical axis represents the maximum communication distance of the RFID tag 31 and the horizontal axis represents the thickness of the spacer 33.

In this case, the thickness of the spacer 33 corresponds to a space between the RFID tag 31 and the metal plate 32. In the example shown in FIG. 5, it is assumed that a frequency band of the communication radiowave is a 2.45 gigahertz (GHz) band. In this case, one wavelength of the radiowave corresponds to a length of 12 cm.

The frequency band of the communication radiowave of the RFID tag 31, to which the present invention can be applied, is not limited to the 2.45 GHz band. Accordingly, the present invention can be applied to the REID tag 31 that employs a radiowave in another frequency band such as a UHF band.

The maximum communication distance obtained when a communication is performed singularly by the RFID tag 31 without employing the metal plate 32 and the spacer 33 is shown in FIG. 5. In this case, the maximum communication distance becomes approximately 100 cm.

As shown in FIG. 5, when the thickness of the spacer 33 becomes integral multiple of half wavelength of a radiowave, that is, n/2 wavelength, where n is a positive integer including zero, the metal plate 32 acts as a reflector plate that reflects a radiowave. Therefore, a radiowave directly received by the RFID tag 31 and a radiowave reflected by the metal plate 32 cancel each other, and the maximum communication distance becomes substantially zero (see area A shown in FIG. 5).

In other words, if the distance between the reader/writer and the REID tag 31 is within 1 meter, the communication is sufficiently enabled in a normal state. However, if the spacer 33 having a thickness corresponding to the n/2 wavelength is placed between the REID tag 31 and the metal plate 32, the communication is disabled.

With the above characteristics, when the communication function of the REID tag 31 needs to be disabled, it is possible to easily and effectively disable the communication function by attaching the REID tag 31 to the metal plate 32 via the spacer 33, in a place where the REID tag 31 is installed.

When the REID tag 31 is such a type that is compliant to a multifrequency for performing a communication using radiowave in a plurality of different frequency bands, if the thickness of the spacer 33 is set to be the n/2 wavelength of a specific radiowave corresponding to a specific frequency, it is possible to exclusively disable the communication function of the REID tag 31 for the specific radiowave without disabling the communication function of the REID tag 31 for other radiowave with other frequencies.

Furthermore, if the reader/writer that performs a communication with the RFID tag 31 can change a frequency of the radiowave to be used for the communication, it is possible to enable and disable the communication function of the specific RFID tag 31 to which the metal plate 32 and the spacer 33 having a predetermined thickness are attached, by changing the frequency.

Moreover, if the thickness of the spacer 33 is multiple of quarter wavelength (i.e., 3 cm) or multiple of three-quarters wavelength (i.e., 9 cm) of the radiowave, the radiowave directly received by the REID tag 31 and the radiowave reflected by the metal plate 32 strengthen each other, so that the maximum communication distance can be lengthened (see area B shown in FIG. 5).

Specifically, if the thickness of the spacer 33 is multiple of quarter wavelength or multiple of three-quarters wavelength of the radiowave, the maximum communication distance is approximately doubled or increased by 1.5 times compared to a case where the RFID tag 31 is singularly performs the communication, as shown in FIG. 5.

With the above characteristics, it is possible to easily and effectively realize a stable communication, which has high communication density and is not affected by an effect of a multipath reflection from an outside, in a place where the RFID tag 31 is installed for performing data read/write to/from the RFID tag 31.

In the example shown in FIG. 5, the maximum communication distance is largely extended when the thickness of the spacer 33 is multiple of quarter wavelength or multiple of three-quarters wavelength of the radiowave, compared to a case where the RFID tag 31 is singularly used. On the other hand, there is a case in which the maximum communication distance is lengthened even when the thickness of the spacer 33 is anisoploid of quarter wavelength of the radiowave, that is, (2n+1)/4 wavelength, where n is a positive integer including zero. In this case, it is possible to set the thickness of the spacer 33 to be the (2n+1)/4 wavelength of the radiowave.

If the thickness of the spacer 33 is equal to or narrower than a multiple of quarter wavelength of the radiowave, the maximum communication distance is linearly increased as the thickness of the spacer 33 is increased, as shown in FIG. 5 (see area C shown in FIG. 5).

With the above characteristics, it is possible to control the maximum communication distance of the RFID tag 31 by using the spacer 33 having an optimal thickness, without changing an output intensity of the radiowave. Accordingly, it is possible to easily and effectively set a communication area in a place where the RFID tag 31 is installed, even when it is required to exclusively perform a communication with the RFID tag 31 located with a predetermined distance from the reader/writer for performing data read and data write to the RFID tag 31.

Particularly, with the RFID tag 31 that performs a communication using a radiowave in the UHF frequency band, there is often a case that the communication area becomes too wide or the radiowave reflected by a metal surface exiting in the communication area largely affects a communication. In this case, however, if the spacer 33 is used, it is possible to easily and effectively adjust the communication area depending on conditions of a place where the RFID tag 31 is installed. Therefore, more stable communication properties with little multipath reflection effect can be achieved, compared to a case where the RFID tag 31 singularly performs the communication.

If an object to which the RFID tag 31 is attached is made of metal, such as a can and a metal container, it is possible to realize a stable communication by attaching the RFID tag 31 to the object via the spacer 33.

According to the above embodiments, it is assumed to use a liner relation between the maximum communication distance and the thickness of the spacer 33, when the thickness of the spacer 33 is equal to or narrower than a multiple of quarter wavelength of a radiowave. Alternatively, it is possible to use a liner relation between the communication distance and the thickness of the spacer 33 even when the thickness of the spacer 33 is equal to or wider than n/4 wavelength of a radiowave and equal to or narrower than (n+1)/4, where n is a positive integer larger than one.

As described above, upon installing the RFID tag 31 to a target site, it is possible to easily and effectively realize a stable communication and adjust a communication distance for the RFID tag 31, by previously examining a relation between the maximum communication distance and the thickness of the spacer 33 as shown in FIG. 5, and by evaluating a communication environment of the target site.

Furthermore, similarly to the case described in connection with FIG. 3, it is possible to control the directivity of the radio communication by replacing the metal plate 32 with other type of metal plate having a different width, even when the spacer 33 is used.

As described above, according to the second embodiment, the spacer 33 made of nonmetallic material holds the RFID tag 31 and the metal plate 32, with a predetermined space kept from each other, so that the space between the RFID tag 31 and the metal plate 32 can be adjusted by the spacer 33. Therefore, it is possible to easily and effectively control the distance and the directivity of the radio communication.

Although the embodiments of the present invention are described above, the present invention is not limited to the above embodiments and various modifications can be made without departing from the spirit or scope of the general inventive concept as defined by the appended claims and their equivalents.

For example, although an experimental result is not described in the first embodiment, a relation between the maximum communication distance and the thickness of the spacer 33 shown in FIG. 5, that is, a relation between the maximum communication distance and the distance between the RFID tag 31 and the metal plate 32 is also established in the communication device 10 shown in FIG. 10.

In this case, it is possible to control the communication area in the same manner as that described in the second embodiment, by setting the space between the RFID tag 11 and the metal plate 13 to be n/2 wavelength of a communication radiowave, to be (2n+1)/4 wavelength, or to be equal to or longer than n/4 wavelength and equal to or shorter than (n+1)/4 wavelength, where n is a positive integer including zero, by using the space adjustment screw 14.

As described above, according to one aspect of the present invention, it is possible to easily and effectively control a distance and a directivity of a radio communication.

Furthermore, according to another aspect of the present invention, it is possible to easily and effectively control a distance and a directivity of a radio communication by replacing an attached metal body with other type of metal body having a different form.

Moreover, according to still another aspect of the present invention, it is possible to easily and effectively control a distance and a directivity of a radio communication in a desired place.

Furthermore, according to still another aspect of the present invention, it is possible to easily disable a function of an RFID tag in a desired place if required.

Moreover, according to still another aspect of the present invention, it is possible to easily and effectively control a distance and a directivity of a radio communication.

Furthermore, according to still another aspect of the present invention, it is possible to easily and effectively control a distance and a directivity of a radio communication to perform a radio communication.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device including a radio frequency identification tag that performs a radio communication with a predetermined device, the communication device comprising:

a first metal body having an electrical conductivity; and a space adjustment unit configured to adjust a space between the first metal body and the radio frequency identification tag, wherein the first metal body is configured to be replaced with a second metal body, and when the first metal body is replaced with the second metal body, the space adjustment unit is configured to adjust a space between the second metal body and the radio frequency identification tag;

wherein the space adjustment unit disables a communication function of the radio frequency identification tag by bringing the radio frequency identification tag into contact with the first metal body.

2. The communication device according to claim 1, wherein the space adjustment unit is made of nonmetallic material, and the space between the radio frequency identification tag and the first metal body is adjusted by keeping the radio frequency identification tag and the first metal body with a predetermined space.

3. A communication device including a radio frequency identification tag that performs a radio communication with a predetermined device, the communication device comprising:

a metal body having an electrical conductivity; and a space adjustment unit configured to adjust a space between the metal body and the radio frequency identification tag, wherein the space adjustment unit is a screw, and the space between the radio frequency identification tag and the metal body is adjusted by tightening and loosening the screw;

wherein the space adjustment unit disables a communication function of the radio frequency identification tag by bringing the radio frequency identification tag into contact with the metal body.

4. A method of performing a radio communication between a radio frequency identification tag and a predetermined device, the method comprising:

adjusting a space between the radio frequency identification tag and a metal body having an electrical conductivity; performing a radio communication between the radio frequency identification tag and the predetermined device after adjusting the space between the radio frequency identification tag and the metal body; and disabling a communication function of the radio frequency identification tag by bringing the radio frequency identification tag into contact with the first metal body.

* * * * *